March 12, 1935.  G. F. BEHRINGER  1,993,820
MULTIPLE VERNIER ADJUSTING MECHANISM FOR VARIABLE CONDENSERS
Filed May 3, 1934
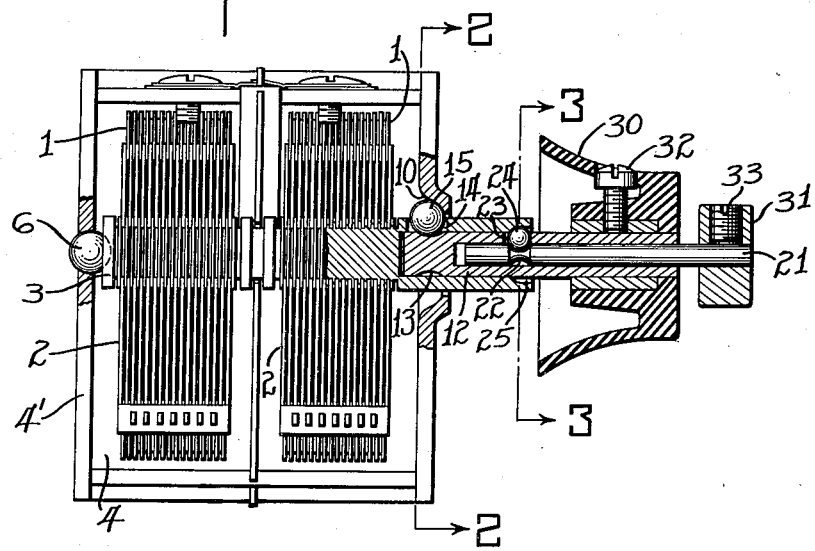
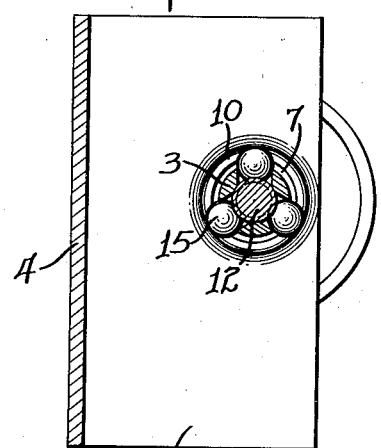
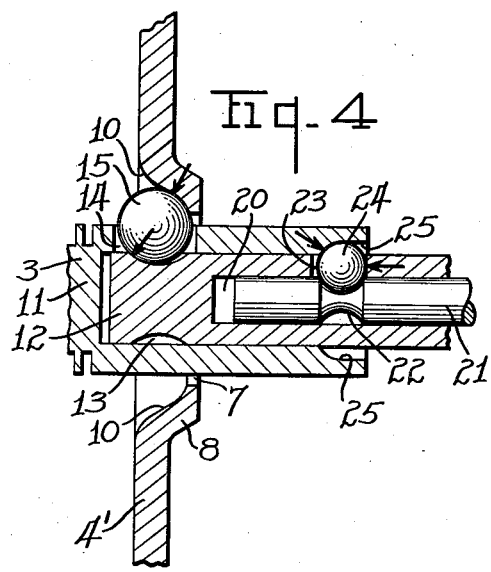
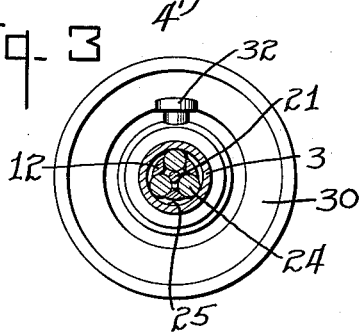
Inventor
Grover F. Behringer
By Owen & Owen
Attorneys Patented Mar. 12, 1935

1,993,820

UNITED STATES PATENT OFFICE 1,993,820

MULTIPLE VERNIER ADJUSTING MECHANISM FOR VARIABLE CONDENSERS

Grover F. Behringer, Defiance, Ohio, assignor to The American Steel Package Company, Defiance, Ohio, a corporation of Ohio Application May 3, 1934, Serial No. 723,766

5 Claims. (Cl. 74—10)

This invention relates to controls for variable condensers and more particularly to a multiple vernier adjusting mechanism for such instruments.

It has heretofore been proposed to adjust the relative setting of the plates of a variable condenser by means of planetary gearing, and to use in this connection, a plurality of angularly spaced balls frictionally engaged with the adjusting shaft and seated in the shaft to be adjusted. In every instance of a device of this character it has been necessary to provide a spring means to tension at least one of the relatively rotatable shafts so as to stress the shaft, thereby pinching or frictionally gripping the balls or rolling members so that the balls are caused to roll and are prevented from merely slipping in their races. Further, it is frequently desirable to provide more than one speed reduction so that "coarse" tuning may be accomplished with one reduction and "fine" tuning with another. The vernier adjusting devices heretofore proposed have been incapable of thus multiplying the action due to the inherent structural limitations derived from the use of extraneous springs.

The present invention has for its primary object the provision of a multiple speed reducing control for the adjustment of a variable condenser which is characterized by the freedom from screw fastenings, springs and similar extraneous elements.

Another object of the invention is the provision of a device of this kind which has a smooth and positive action.

A further object is to provide a control which is capable of ready and inexpensive manufacture and assembly and which, when in use, requires no adjustment or attention.

Other objects and advantages of the invention will become apparent as the description proceeds, reference being had to the accompanying drawing, in which—

Figure 1 is a plan of a variable condenser with parts embodying the present invention in section. Fig. 2 is a section on line 2—2 of Fig. 1. Fig. 3 is a section on line 3—3 of Fig. 1, and Fig. 4 is an enlarged view of the reduction device showing the several lines of contact between the shafts and the balls.

In the embodiment of the invention shown, there are the usual stationary condenser electrodes 1 in adjustably interleaved relation to the movable electrodes 2 which are carried by a rotor shaft 3. A U-shaped frame 4 is provided in which the stationary electrodes 1 are mounted. The frame is made of sheet metal and in the course of its manufacture the upturned end walls 4' are bowed slightly inward of the position which they finally occupy when assembled. The reason for this step will presently become apparent.

The rotor shaft 3 is supported at one end in the frame 4 by a thrust bearing ball 6 in one end wall 4', and at its other end projects through an opening 7 in the other end wall of the frame. The wall of the frame immediately surrounding the opening 7 is dished outwardly as at 8 to provide a bearing race 10. The rotor shaft 3 is cored out or bored axially for a distance at 11 to receive a sleeve 12 which is provided with an external annular groove 13 acting as an inner ball race. The cored portion of the shaft 3 is drilled at 14 between the outer and inner races 10 and 13 to form a plurality of spaced seats in which balls 15 are inserted, which latter are adapted to roll in the said races 10 and 13.

The sleeve 12 is also cored out at 20 to receive an outer control spindle 21 which is provided with an annular groove 22 to act as a second inner race. The sleeve 12 is drilled at 23 to form a series of seats to permit the insertion of a second set of speed reducing balls 24, which act in the inner race 22 of the small outer spindle 21 and in an outer race 25, which is formed in the extremity of the rotor shaft 3, for instance by counter-sinking the bore 11.

Suitable actuating knobs 30 and 31 are fixed as by set screws 32 and 33 on the sleeve 12 and outer spindle 21, respectively.

In order to assure a rolling of the two sets of balls 15 and 24 in their respective races and prevent sliding thereof it is necessary to pinch the balls between the races. Instead of providing a separate spring compressing means to accomplish this, the present invention proposes to utilize the inherent resilient properties of the U-shaped frame 4. As previously stated the frame is formed with the upturned end walls 4' slightly convergently disposed with respect to the position they are intended to occupy in the final assembly. During assembly these end walls are sprung apart, and when finally assembled tend to resume their convergent position, and so tend to push inwardly on the thrust bearing ball 6 at the rear and balls 15 at the front. The forces acting may be followed in Fig. 4, and it will be seen that the compressive force of the frame is transmitted through balls 15 to the race 13 of the sleeve 12 so that this sleeve tends to move rearwardly in the bore 11 of the rotor shaft 3. Such movement is resisted however by the balls 24 impinging against the second outer race 25 in the end of the rotor shaft 3. Thus both sets of balls are constantly stressed to the desired extent, so that a non-slipping rolling action is assured. It will be appreciated that the omission of the usually necessary spring means to compress the balls in the races greatly improves the electrical characteristics of the condenser by eliminating this source of troublesome distributed capacity which necessarily impairs the characteristic curve of the instrument. Aside from the electrical advantage gained, there is a decided reduction in the cost of manufacture of the instrument due to the reduction in number of necessary parts.

The operation of the device will be readily apparent. When it is desired to use only the first speed reduction, the knob 30 is turned and the balls act as a frictional planetary gear set and press against the drilled seats to move the rotor shaft 3 ahead of them in their movement in the races 10 and 13. When it is desired to use the "fine tuning" control, the knob 31 is turned. It will be seen that the balls 24 act as a frictional planetary gear set to move the sleeve 12, and that the latter acts through balls 15 to move the rotor shaft 3. Obviously the ratios obtainable may be varied by changing the diameter of balls used, so that the adjusting mechanism may be adapted to any desired conditions.

It will be appreciated that the present invention is more than the addition of a second gear in a train, to which no claim is made, the claimed novelty residing in the accomplishment of this feature without the corresponding addition of a second friction producing element. Obviously numerous modifications may be made in the form and arrangement of the parts, other than the change in gear ratios suggested above, without departing from the spirit of the appended claims.

What I claim is:—

1. In a variable condenser, in combination, a shaft having a hollow front end formed with a counter sunk seat, a thrust bearing for the shaft, an intermediate sleeve mounted axially in the hollow portion of said shaft, said sleeve having seats formed therein, a spindle mounted axially in said sleeve, a ball race around said spindle opposed to the countersunk seat of said shaft, balls seated in the seats of said sleeve and in intimate rolling contact with the race of said spindle and said shaft, a ball race around said sleeve, a stationary race around said shaft, a second set of balls seated in said shaft in intimate rolling contact with said stationary race and the race on said sleeve, and a resilient frame in which said thrust bearing is mounted and in which said stationary race is formed tending to produce relative axial movement of said shaft and said sleeve whereby a pinching action is exerted on both sets of balls making them operate as planetary gears between said spindle and said sleeve and said sleeve and said shaft respectively.

2. In a variable condenser having a hollowed rotor shaft, a multiple vernier control comprising a sleeve mounted axially in said shaft, a spindle mounted axially in said sleeve, a planetary gear set to turn said sleeve from said spindle, a similar set to turn said rotor shaft from said sleeve, and a single means to constantly frictionally stress both of said planetary gear sets.

3. In a variable condenser, a frame having normally inwardly sprung end walls with a thrust bearing in one wall and an opening in the other wall forming a ball race, a rotor shaft extended through said opening and having an end bearing against said thrust bearing, said shaft having a hollow free end with an annular set of radial openings and an internal race, a control sleeve mounted in said shaft and having an annular race and an annular set of radial openings in register respectively with the openings and race of said shaft, a control spindle mounted in said sleeve and having an annular race in register with the openings in said sleeve, a set of balls in the shaft openings in intimate frictional contact with the frame and sleeve races, and a set of balls in said sleeve openings in intimate frictional contact with said shaft and spindle races, the spring of said frame being utilized to stress both sets of balls in their races.

4. In a variable condenser, a frame having end walls with a thrust bearing in one wall and an opening in the other wall, a rotor shaft extended thru said opening and having an end bearing against said thrust bearing, said shaft having a hollow free end with an annular set of radial openings and an internal race, a control sleeve mounted in said shaft and having an annular race and an annular set of radial openings in register respectively with the openings and race of said shaft, a control spindle mounted in said sleeve and having an annular race in register with the openings in said sleeve, a set of balls in the shaft openings in constant intimate frictional contact with the frame and sleeve races, and a set of balls in said sleeve openings in constant intimate frictional contact with said shaft and spindle races, and a single means to constantly stress both sets of balls in their races.

5. In a variable condenser having a hollow rotor shaft, a multiple vernier control for said shaft comprising a sleeve mounted axially in said shaft, a spindle mounted axially in said sleeve, a plurality of angularly spaced balls comprising a planetary gear set to turn said sleeve from said spindle, a similar set to turn said rotor shaft from said sleeve, and a frame having normally inwardly sprung end walls to receive said shaft whereby the spring of the frame is utilized to stress both sets of planetary gears.

GROVER F. BEHRINGER.